(12) United States Patent
Pillay Esnault

(10) Patent No.: US 7,912,980 B1
(45) Date of Patent: Mar. 22, 2011

(54) SETTING A MAXIMUM PREFIX EXPORTATION LIMIT WITHIN A NETWORK DEVICE

(75) Inventor: Padma Pillay Esnault, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2236 days.

(21) Appl. No.: 10/687,989

(22) Filed: Oct. 17, 2003

(51) Int. Cl.
*G06F 15/173* (2006.01)

(52) U.S. Cl. ....................................................... 709/238
(58) Field of Classification Search .................... 709/238
See application file for complete search history.

(56) References Cited

U.S. PATENT DOCUMENTS

| | | | |
|---|---|---|---|
| 6,212,188 B1 * | 4/2001 | Rochberger et al. ...... | 370/395.32 |
| 7,085,241 B1 * | 8/2006 | O'Neill et al. ................. | 370/254 |
| 7,116,665 B2 * | 10/2006 | Balay et al. ..................... | 370/392 |
| 7,174,387 B1 * | 2/2007 | Shand et al. ................... | 709/238 |
| 7,245,619 B1 * | 7/2007 | Guan et al. ..................... | 370/254 |
| 7,286,479 B2 * | 10/2007 | Bragg ............................. | 370/238 |
| 7,289,437 B2 * | 10/2007 | Chiruvolu ...................... | 370/228 |
| 7,292,585 B1 * | 11/2007 | Slaughter et al. ............. | 370/400 |
| 7,307,990 B2 * | 12/2007 | Rosen et al. ................... | 370/392 |
| 7,328,278 B2 * | 2/2008 | Pesce et al. .................... | 709/238 |
| 7,334,047 B1 * | 2/2008 | Pillay-Esnault .............. | 709/242 |
| 7,369,556 B1 * | 5/2008 | Rekhter et al. ................. | 370/392 |
| 7,372,953 B2 * | 5/2008 | Delaney et al. .......... | 379/221.08 |
| 7,418,519 B1 * | 8/2008 | Chavali .......................... | 709/242 |
| 7,554,930 B2 * | 6/2009 | Gaddis et al. .................. | 370/254 |
| 2002/0078223 A1 * | 6/2002 | Baldonado et al. ........... | 709/232 |
| 2002/0147842 A1 * | 10/2002 | Breitbart et al. .............. | 709/241 |
| 2002/0191541 A1 * | 12/2002 | Buchanan et al. ............. | 370/230 |
| 2003/0014665 A1 * | 1/2003 | Anderson et al. ............. | 713/201 |
| 2003/0154304 A1 * | 8/2003 | Pesce et al. .................... | 709/238 |
| 2003/0188018 A1 * | 10/2003 | Guerrero et al. .............. | 709/242 |
| 2003/0231587 A1 * | 12/2003 | Sankaran et al. .............. | 370/230 |
| 2005/0044198 A1 * | 2/2005 | Okitsu et al. .................. | 709/223 |
| 2005/0102423 A1 * | 5/2005 | Pelavin et al. ................. | 709/238 |

OTHER PUBLICATIONS

Hunt, Craig; TCP/IP Network Administration; Second Edition, 1997;, Copyright 1999, O'Reilly and Associates; located through http://www.unix.org.ua/orelly/networking/tcpip/index.htm on Dec. 20, 2007.*
Cisco Systems, Inc. "BGP Restart Session After Max-Prefix Limit"; Cisco Systems, 2003; pp. 1-22.*

* cited by examiner

*Primary Examiner* — Yemane Mesfin
*Assistant Examiner* — Thomas Richardson
(74) *Attorney, Agent, or Firm* — Shumaker & Sieffert, P.A.

(57) ABSTRACT

Techniques are described for setting a maximum prefix limit within a network device. A network device, for example, is described that includes an exterior routing protocol module and an interior routing protocol module. The exterior routing protocol module exports network routes to the interior routing protocol module. The network device further includes a management interface to receive a command that specifies an export limit, and a control unit that prevents the exterior routing protocol module from exporting more than the export limit of the network routes to the interior routing module.

12 Claims, 6 Drawing Sheets

| | INTERIOR PROTOCOL | PREFIX LIMIT DATA (45) | PREFIX COUNTERS (48) |
|---|---|---|---|
| 49A | ISIS L1 | 10000 | 7893 |
| 49B | ISIS L2 | 5000 | 2342 |
| 49C | OSPF | 5000 | 4093 |

FIG. 3

SETTING A MAXIMUM PREFIX EXPORTATION LIMIT WITHIN A NETWORK DEVICE

TECHNICAL FIELD

The invention relates to computer networks and, more particularly, to routing devices operating within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet and forwards the packet in accordance with the routing information.

Large computer networks, such as the Internet, often include many routers grouped into administrative domains called "autonomous systems." In order to maintain an accurate representation of the network, routers periodically exchange routing information in accordance with defined protocols. These routing protocols generally fall into two categories. Routers located at the edges of different autonomous systems generally use exterior routing protocols to exchange information. One example of an exterior routing protocol is the Border Gateway Protocol (BGP). Routers within an autonomous system generally utilize interior routing protocols for exchanging routing information. One example of an interior routing protocol is the Intermediate System to Intermediate System (ISIS) protocol, which is an interior gateway routing protocol for IP-based networks. Other examples of interior routing protocols include the Open Shortest Path First (OSPF), and the Routing Information Protocol (RIP).

When two routers initially connect, they typically exchange routing information that describes the routes of which each router is aware. The routers send control messages to incrementally update the routing information when the network topology changes. For example, the routers may send update messages to advertise newly available routes, and to withdraw routes that are no longer available.

Routers operating within different autonomous systems or domains may be aware of, and able to support, vastly different numbers of routes. For example, a router operating within an internet service provider network, i.e., a service provider (SP) router, may exchange routing information with a large number of routers using a variety of routing protocols, including both exterior and interior routing protocols. Consequently, the SP router may be aware of hundreds of thousands or even millions of routes, e.g., routes through the internet service provider network, routes to various customer networks and routes to other service providers.

The SP router, however, is typically configured to communicate only a small subset of these routes to a given router operating within a customer network. Specifically, the SP router only communicates a small percentage of these routes to the customer router via an exterior routing protocol. The customer router may then utilize an interior routing protocol to communicate these routes to other routers within the customer network. This process is often referred to as the "leaking" or "exporting" of routes from an exterior protocol to an interior protocol.

SUMMARY

In general, the techniques are directed to limiting the number of routes that can be exported to an interior routing protocol. The techniques may be applied to limit the number of routes exported to the interior routing protocol from one or more exterior routing protocols, one or more interior routing protocols, or combinations thereof.

More specifically, a router is described that supports a command syntax in which a prefix limit command may be used to specify a maximum number of routes that can be exported. The prefix limit command allows a client, e.g., a system administrator or an automated script, to direct a router to limit the number of routes that may be exported to each "instance" of an interior routing protocol executing on that router. The term instance, as used herein, refers to a particular instantiation of an interior routing protocol, such as ISIS levels, e.g., L1 and L2, and OSPF instances.

In particular, the prefix limit command directs the router to make an accounting of all routes exported to each instance of an interior routing protocol. When operating in prefix limit mode, each time a route is imported to the interior protocol, the router increments a prefix counter associated with the interior routing protocol. The router compares the prefix counter to the prefix limit specified for that interior routing protocol to determine whether the prefix counter exceeds the prefix limit associated with the interior routing protocol. If the prefix count exceeds the prefix limit, the router automatically enters an "overload" condition.

While operating in the overload condition, the router assumes all routes exported to the interior routing protocol are invalid and clears them from its routing information, e.g., routing tables. The router may rebuild its interior routes, preferably to a maximum metric, e.g., the maximum effective "distance" between it and neighboring routers in the network. The router advertises the updated routing information with the maximum metric to other peer routers. In this manner, the router may effectively direct the other routers to find other routes through the network, effectively removing the router from the network and avoiding network failure. The router may generate alert messages, display indicators, or other output in an attempt to alert a system administrator that an excessive amount of routes have been leaked into an interior routing protocol. The router remains in this overload condition until receiving input indicating that corrective action has been taken. Upon receiving the input, the router terminates the overload condition, resumes prefix limit mode, and begins re-learning exterior routes via the exterior routing protocol.

In one embodiment, a method comprises maintaining a count of routes exported to an interior routing protocol, and rejecting additional routes exported to the exterior routing protocol when the count exceeds an export limit.

In another embodiment, a network device comprises an exterior routing protocol module and an interior routing protocol module. The exterior routing protocol module exports network routes to the interior routing protocol module. The network device further comprises a management interface to receive a command that specifies an export limit, and a control unit that prevents the exterior routing protocol module from exporting more than the export limit of the network routes to the interior routing module.

In another embodiment, a method comprises receiving at a network device an export limit command from a client, and counting, in response to the export limit command, a number of routes exported from an exterior routing protocol process executing on the network device to an interior routing protocol process executing on the network device.

In another embodiment, a network device comprises a control unit that limits a number of routes exported from an exterior routing protocol to an interior routing protocol.

In another embodiment, a computer-readable medium comprises instructions to cause a processor to maintain a count of routes exported from an exterior routing protocol to an interior routing protocol, and reject additional routes to be exported from the exterior routing protocol based on the count and an export limit.

In another embodiment, a method comprising receiving from a client a command to direct a network device to count routes exported from an exterior routing protocol to an interior routing protocol, receiving from the client an export limit indicative of a maximum number of routes that may be exported from the exterior routing protocol to a specific instance of the interior routing protocol, and exporting, in the network device, routes from the exterior routing protocol to the specific instance of the interior routing protocol. The method further comprises incrementing a prefix count each time a route is exported from the exterior routing protocol to the specific instance of the interior routing protocol, comparing the prefix count to the export limit, and rejecting additional routes from the exterior routing protocol if the prefix count exceeds the export limit.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a block diagram illustrating an exemplary prefix counters and prefix limit data maintained in accordance with techniques described herein.

DETAILED DESCRIPTION

Figure 1:
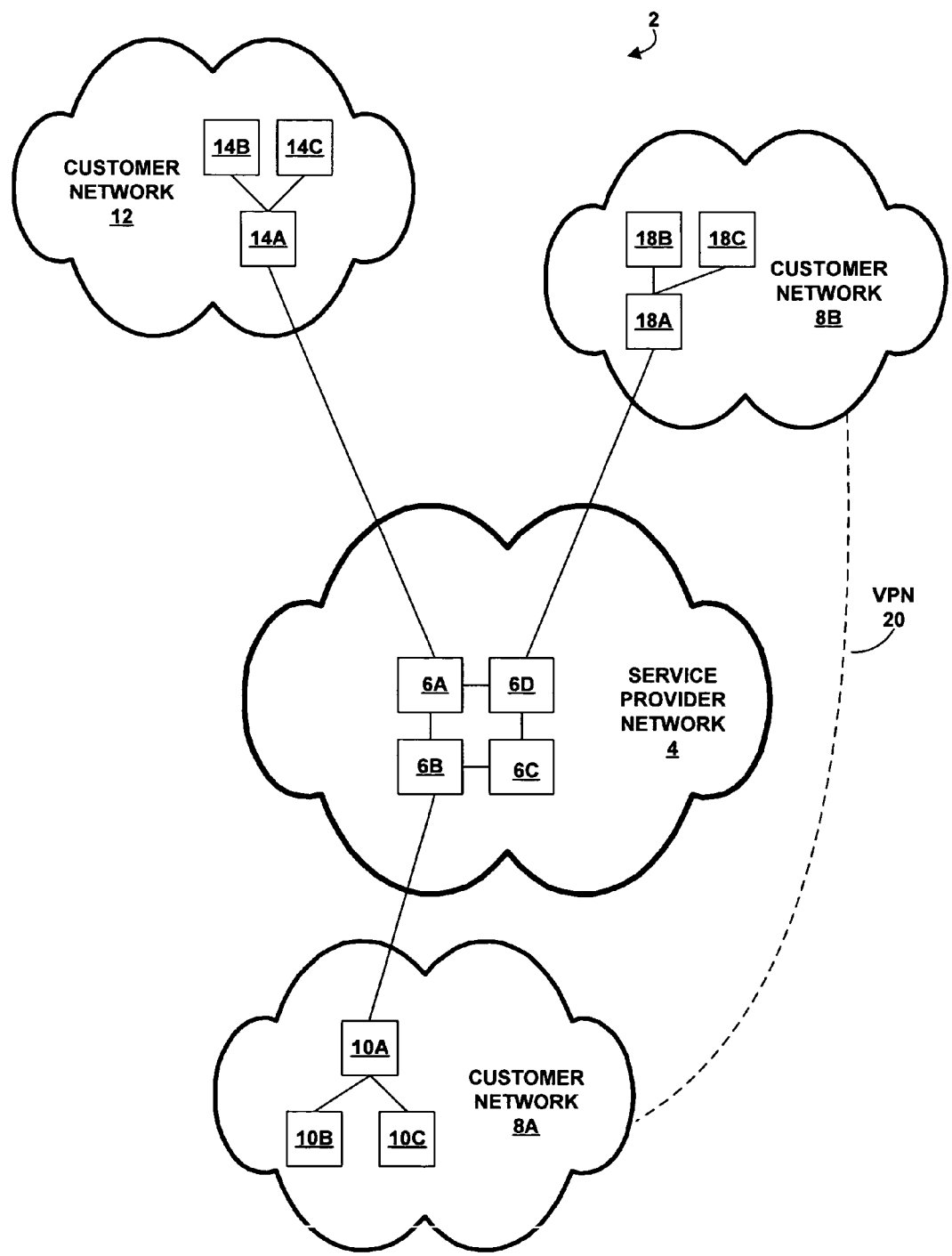
FIG. 1 is a block diagram illustrating an example network environment.

FIG. 1 is a block diagram showing an illustrative network system 2. In this system, customer networks 8A, 8B, and 12 are connected to a service provider network 4. Customer networks 8A, 8B represent local networks for geographically distributed centers of an organization, while customer network 12 represents a local network for a different entity, such as an individual or organization. Customer networks 8A, 8B and 12 are coupled to service provider network 4 to provide communication with each other or with other networks or devices (not shown) connected to service provider network 4. Each of customer networks 8A, 8B and 12 may include one or more computing devices (not shown), such as personal computers, laptop computers, handheld computers, workstations, servers, switches, printers, and the like. Although an actual service provider may provide services to a large number of dispersed customer networks, for simplicity FIG. 1 shows only three customer networks 8A, 8B and 12 served by the service provider network 4.

Service provider network 4 may be coupled to one or more other service provider networks (not shown) administered by other providers, and may thus form part of a large-scale public network, e.g., the Internet. Although not illustrated, service provider network 4 may also include a variety of network devices, such as routers, switches, web servers, database servers, and the like.

For purposes of illustration, customer networks 8A and 8B of FIG. 1 are shown as part of a Virtual Private Network (VPN) 20. VPNs are often used to securely share data over public network infrastructure, such as the Internet. For example, an enterprise that includes multiple geographically separated sites, each site including one or more computing devices, may establish a VPN to allow the computing devices to securely communicate through the Internet or other public network infrastructure. In the system shown in FIG. 1, customer networks 8A and 8B of VPN 20 share data over service provider network 4.

In general, network devices that form a part of a particular one of customer network 8A, 8B, and 12 or service provider network 4 are referred to herein as "internal" to that network. Any devices, or even other networks, not part of that particular network are referred to as "external". Thus, in FIG. 1, routers 10A-10C of customer network 8A and any other network devices operating within customer network 8A are referred to as "internal" to the customer network. Furthermore, because customer networks 8A and 8B are illustrated as part of the same VPN 20, customer network 8B and its associated routers 18A-18C and any other network devices are also viewed as "internal" with respect to customer network 8A. On the other hand, customer network 12 and its associated routers 14A-14C and any other network devices operating within customer network 12 are "external" with respect to customer networks 8A and 8B. Similarly, service provider network 4 is "external" with respect to each of customer networks 8A, 8B, and 12, and also of VPN 20.

A router, such as customer router 10A, typically utilizes one or more exterior routing protocols to exchange routing information with routers of other domains or autonomous systems, e.g., provider router 6B. In order to maintain an accurate network topology, router 10A, for example, periodically exchanges routing information with other routing devices, e.g., provider router 6B, and internal routers 10B and 10C in accordance with defined protocols. For example, customer router 10A may utilize the Border Gateway Protocol (BGP) to share routing information with provider router 6B. In this manner, router 10A learns of "external" routes to devices external to customer network 8A. Similarly, router 10A exchanges routing information with customer routers 10B and 10C using one or more interior routing protocols, e.g., IBGP, ISIS, OSPF, RIP, and the like, to share the "exterior" routes with customer routers 10B and 10C, and to learn of "internal" routes to devices within customer network 8A.

Customer routers 10A, 14A and 18A located at the edge of customer networks 8A, 8B and 12, respectively, may maintain data based on the type of network protocol from which the routes were learned. For example, customer router 10A may maintain route classification data to identify routes learned from provider router 6B via an exterior routing protocol as "external," and routes learned from customer router 10B via an interior routing protocol as "internal routes."

In general, provider routers 6A-6D may be aware of vastly more routes than customer routers 10A-10C, 14A-14C, and 18A-18C. Provider routers 6A-6D, for example, may be aware of routes to each of customer networks 8A, 8B, and 12, as well as other customer networks, service provider networks, public-networks, and the like. Provider routers 6A-6D are configured to communicate only a small subset of these routes to customer routers 10A, 14A, and 18A via an exterior routing protocol. In turn, routers 10A, 14A and 18A "leak" the routes from the exterior routing protocol to an internal routing protocol, and communicate the routes to routers 10B-10C, 14B-14C, and 18B-18C, respectively.

Problems can arise when the number of routes communicated by routers 6A-6D, for example, via the exterior routing protocol exceeds the number of routes the interior protocols executing on customer routers 10A, 14A, and 18A are configured to support. If this occurs, the interior routing protocols executing on customer routers 10A, 14A, and 18A may not be able to properly process all of the routes, which may cause an interruption of operation and even failure of the customer routers. This can occur, for example, when a provider router, such as provider router 6B, is improperly configured through human error, hardware failure, and the like. For example, if provider router 6B improperly leaks a larger number of routes into customer router 10A than router 10A is configured to support, the result can be system failure for a portion of customer network 8A or for the entire customer network 8A.

The problem can arise whenever routes are exported from one instance of a protocol, e.g., an instance of an exterior protocol or an instance of an interior routing protocol, to an instance of interior routing protocol. For example, customer router 10A of customer network 8A may be configured to learn routes of customer network 8B from provider router 6B in order to communicate via VPN 20. Upon learning the routes via an exterior routing protocol, customer router 10A may leak the routes to an interior routing protocol to communicate the routes to customer routers 10B and 10C. For a variety of reasons, provider router 6B may erroneously communicate a substantial number of exterior routes to customer router 10A. This may overwhelm the internal routing protocols executing on customer router 10A, causing router 10A to malfunction.

In accordance with the principles of the invention, an operational mode, referred to as a "prefix limit mode," is therefore provided and described herein to prevent such failures. This operational mode limits the number of prefixes that may be leaked from an exterior routing protocol to an interior routing protocol. The operation mode may be provided by any router, for example one of customer routers 10A, 14A and 18A, that receives routes via an exterior routing protocol and leaks or otherwise exports the routes to an interior routing protocol. For exemplary purposes, the techniques are described in reference to customer router 10A. Moreover, although illustrated herein with reference to limiting routes exported from an exterior routing protocol to an interior routing protocol, the techniques are not so limited. In particular, the techniques may be applied to limit the exportation of routes to an interior routing protocol from an exterior routing protocol, an interior routing protocol, or combinations thereof.

Customer router 10A presents an interface, e.g., a command line interface, by which a local or remote client, e.g., a human administrator or automated script, may configure the customer router to operate in the prefix limit mode. In particular, customer router 10A supports a command syntax that allows the client to enter a prefix limit command, thereby directing the router to operate in the prefix limit mode. The command syntax allows the client to specify a maximum number of routes that customer router 10A may export from an exterior protocol to a particular interior routing protocol. In other words, the command syntax allows the client to apply different prefix limits to different sub-networks within the interior network, e.g., different levels of ISIS or different instances of OSPF.

This maximum number of routes is termed the prefix limit. The prefix limit command directs customer router 10A to make an accounting of all prefixes learned from an exterior protocol and exported to the particular interior routing protocol. Each time a route is exported from the exterior protocol, customer router 10A increments a prefix counter associated with the interior routing protocol, and compares the prefix counter to the prefix limit specified for that interior routing protocol.

If the prefix count exceeds the prefix limit, customer router 10A automatically enters an "overload" condition. While operating in the overload condition, customer router 10A assumes all routes learned from an exterior protocol are invalid and clears them from its routing information, e.g., routing tables. Customer router 10A also rebuilds its interior routes, preferably to a maximum metric, e.g., the maximum effective "distance" between it and neighboring routers in the network. Customer router 10A advertises the updated routing information with the maximum metric to other peer interior routers, e.g., customer routers 10B and 10C.

In this manner, customer router 10A effectively directs the other interior customer routers 10B and 10C to find other routes through the network, effectively removing customer router 10A from the network and avoiding network failure. Customer router 10A may also generate alert messages, display indicators, or other output in an attempt to alert a system administrator that an excessive amount of routes have been leaked into an interior routing protocol. Customer router 10A remains in this overload condition until receiving input, e.g., a remote client, that corrective action has been taken. Upon receiving the input, customer router 10A terminates the overload condition, resumes prefix limit mode, and begins re-learning exterior routes via the exterior routing protocol.

Figure 2:
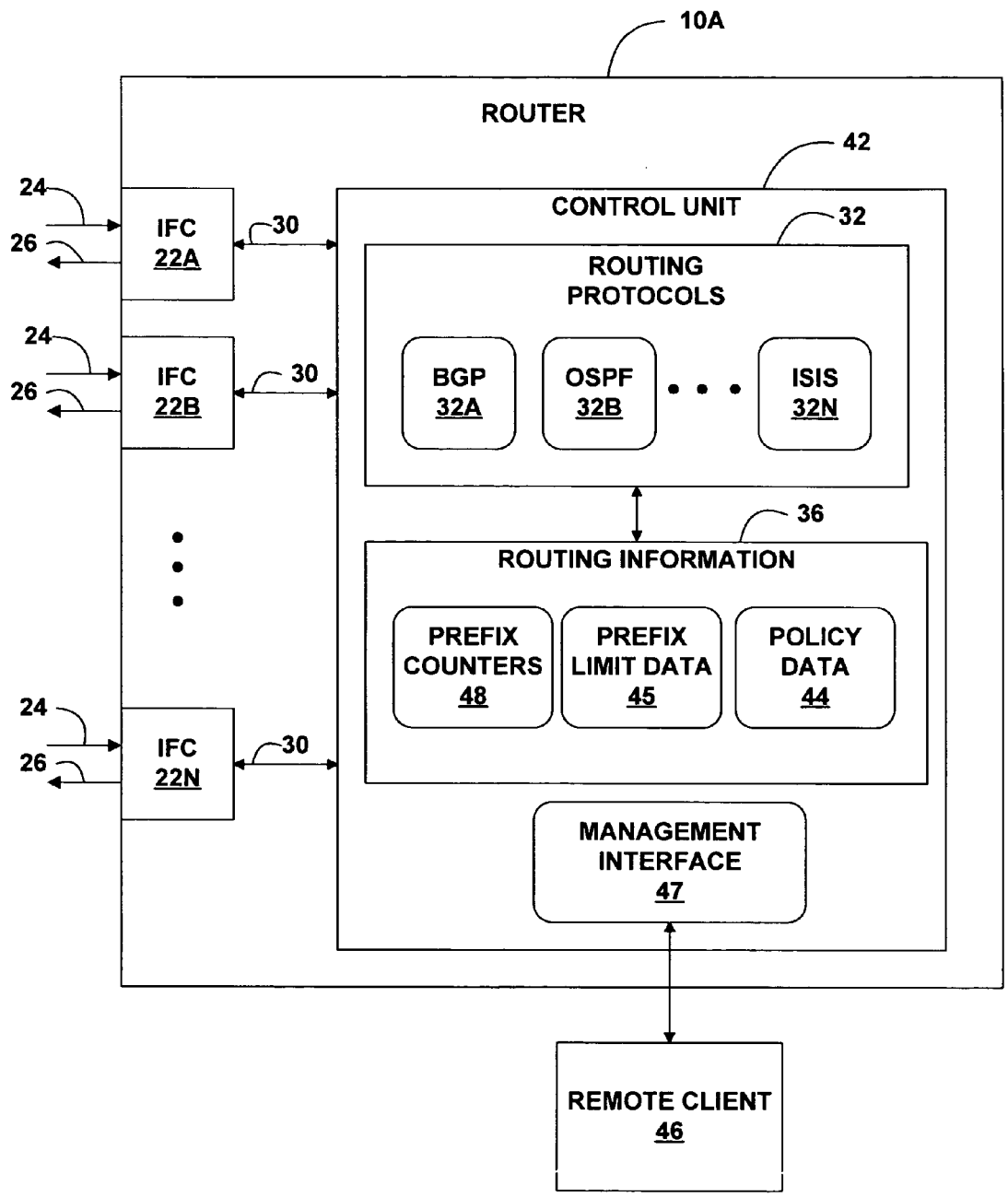
FIG. 2 is a block diagram illustrating an example embodiment of a router that may be configured to operate in accordance with a prefix limit mode described herein.

FIG. 2 is a block diagram illustrating an exemplary embodiment of a router, e.g., customer router 10A of customer network 8A, that supports one embodiment of the presently described prefix limit mode. Customer router 10A includes a control unit 42 that maintains routing information 36. Routing information 36 includes policy data 44, prefix limit data 45, and prefix counters 48. Routing information 36 includes information that describes the topology of the network, including routes through the network. Control unit 42 periodically updates routing information 36 to accurately reflect the topology of the network. Control unit 42 may maintain routing information 36 in the form of one or more tables, databases, link lists, radix trees, databases, flat files, or any other data structures.

Router 10A further includes interface cards 22A-22N ("IFCs 22") that receive and send packet flows via network links 24 and 26, respectively. IFCs 22 are typically coupled to network links 24, 26 via a number of interface ports (not shown), and forward and receive packets and control information to and from control unit 42 via a respective interface 30. Router 10A may include a chassis (not shown) having a number of slots for receiving a set of cards, including IFCs 22. Each card may be inserted into a corresponding slot of the chassis for electrically coupling the card to control unit 42 via a bus, backplane, or other electrical communication mechanism.

Routing protocols 32A-32N (collectively "routing protocols 32") represent various protocols by which router 10A exchanges routing information 36 with other routing devices, such as provider router 6B, or customer routers 10B and 10C, thus learning the available routes through the service provider network 4 and customer network 8A. Routing protocols 32 may include interior routing protocols, e.g. ISIS 32N and OSPF 32B, to exchange routing information with customer routers 10B and 10C, for example, that are also internal to customer 8A, for example. In addition, routing protocols 32 may include exterior routing protocols e.g., BGP 32A, to exchange routing information with devices residing within external networks, such as provider routers 6A-6D of service provider network 4.

In operation, customer router 10A receives inbound packets from network links 24, determines destinations for the received packets, and outputs the packets on network links 26 based on the destinations. More specifically, upon receiving an inbound packet via one of inbound links 24, a respective one of IFCs 22 relays the packet to control unit 42. In response, control unit 42 reads data from the packet, referred to as the "key," that may include, for example, a network destination for the packet. The key may, for example, also contain a routing prefix for another router within the network. Based on the key, control unit 42 analyzes routing information 36 to select a route for the packet.

In addition, customer router 10A includes a management interface 47 with which remote client 46 interacts to access and configure the customer router. Remote client 46 may, for example, provide configuration commands and data to customer router 10A, and may access status information. Control unit 42 may store the configuration input received from remote client 20 as policy data 44. In this manner, remote client 46 may configure the interface cards 22, adjust parameters for supported network protocols, specify the physical components within the routing device, modify the routing information maintained by the router, and access software modules and other resources residing on the router. Policy data 44 may take the form of a text file, such as an ASCII file, databases, tables, data structures, or the like. Management interface 47 may be a command line interface (CLI) or other suitable interface, for processing user or script-driven commands. Moreover, although illustrated for exemplary purposes with reference to remote client 46, a user may directly interact with management interface 47, e.g., via a keyboard or other input device directly coupled to customer router 10A.

In accordance with the principles of the invention, remote client 46 may interact with management interface 47 to configure router 10A to operate in accordance with the presently described prefix limit mode. Specifically, management interface 47 supports a command syntax in which a prefix limit command is used to direct router 10A to operate in prefix limit mode. The command syntax allows remote client 46 to specify a maximum number of routes that customer router 10A may export from an exterior protocol, e.g., BGP 32A, to a particular interior routing protocol, e.g., OSPF 32B or ISIS 32N. In addition, the command syntax allows remote client 46 to apply different prefix limits to different "instances" of a given interior routing protocol. For example, remote client 46 may specify a different prefix limit for different level of ISIS protocol 32N of ISIS or different instances of OSPF.

The following illustrates an exemplary syntax for the prefix limit command.

set routing instances instance_A {
    set protocols {
        [protocol name] {
            prefix-export-limit [N]
        }
    }
    }

In the above-illustrated command syntax, the set protocols command directs management interface 46 to apply the configuration data to the protocol 32 specified by the protocol name parameter. In addition, the instance parameter may be used to identify a particular instance of the specified one of protocol 32. The prefix-export-limit command, referred to generally herein as the "prefix limit" command, directs management interface 47 to set a prefix limit N for the specified protocol instance.

The following pseudocode illustrates an example usage of the above-described prefix limit command:

protocols {
    isis {
        level 1 {
            prefix-export-limit 5000
        }
    }
    }

In this example, remote client 46 has specified a prefix limit of 5,000 routes that may be exported to a first level (L1) of the ISIS routing protocol.

Upon receipt of the prefix limit command, control unit 42 parses the command and stores the prefix limit N specified in the command within prefix limit data 45. The prefix limit command also directs control unit 42 to initiate a corresponding one of prefix counters 48 to count the number of prefixes received from an exterior protocol and exported to the interior routing protocol specified by the prefix limit command. In particular, control unit 42 increments the appropriate one of prefix counters 48 each time a route is exported from an exterior protocol, e.g., BGP 32A, to an interior routing protocol, e.g., OSPF 32B or ISIS 32N.

Control unit 42 then compares the value in prefix counters 48 to the limits specified within prefix limit data 45. If any of the prefix counts for the interior routing protocols exceed the associated prefix limit, customer router 10A goes into an overload condition.

The architecture of customer router 10A illustrated in FIG. 2 is for exemplary purposes only, and the principles of the invention are not limited to this architecture. Control unit 42 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of customer router 10A may be implemented by executing the instructions of the computer-readable medium with one or more processors, discrete hardware circuitry, firmware, software executing on a programmable processor, or a combination of any of the above.

FIG. 3 is a block diagram illustrating an exemplary embodiment of prefix counters 48 (FIG. 2) and prefix limit data 45 maintained by control unit 42 in accordance with techniques described herein. In the illustrated example, a prefix limit has been set for a level one (L1) instance 49A of the ISIS routing protocol. In particular, prefix limit data 45 indicates that a prefix limit of 10,000 prefixes has been defined for the L1 instance 49A. Prefix counters 48 that currently only 7,892 routes have been exported from an exterior routing protocol, e.g., BGP 32A, to the L1 instance 49A.

Similarly, a prefix limit of 5,000 routes has been set for a level two (L2) instance 49B of the ISIS routing protocol, and currently only 2343 routes have been exported from an exterior routing protocol to the L2 instance 49B. A prefix limit of 5,000 routes has also been set for a first instance 49C of the OSPF routing protocol. A total of 4,093 routes have been exported from an exterior routing protocol to the first instance 49C of the OSPF protocol.

In this example, the current values for prefix counters 48 for each interior routing protocol are below the defined prefix limits. As a result, customer router 10A has not entered an overload condition. If, however, any of prefix counters 48 exceeds its associated prefix limit within prefix limit data 45, control unit 42 transitions to an overload condition, as described herein. Control unit 42 may maintain prefix counters 48 and prefix limit data 45 on one or more computer-readable media, and in the form of one or more tables, databases, link lists, radix trees, databases, flat files, or any other data structures. Moreover, prefix counters 48 may be implemented in software, hardware, or combinations thereof.

Figure 4:
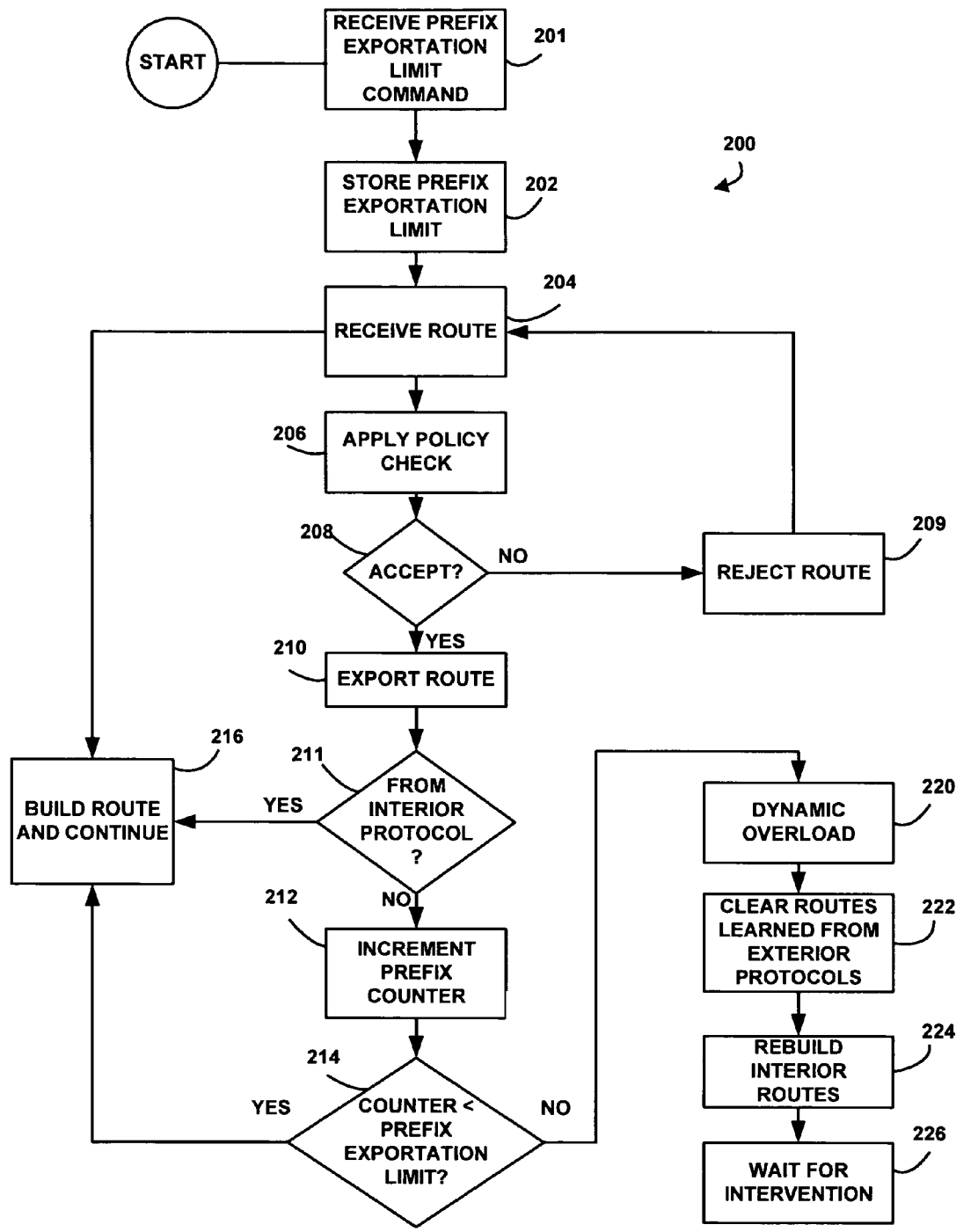
FIG. 4 is a flow diagram showing exemplary operation of a network device operating in prefix limit mode.

FIG. 4 is a flowchart illustrating a router, such as router 10A in FIG. 1, operating in accordance with a prefix limit mode (200) in response to a prefix limit command (201). Initially, router 10A receives a prefix limit command (201) from remote client 46 via management interface 47 (200). As illustrated above, the prefix limit command contains a parameter that specifies a maximum number of routes, referred to herein as the prefix limit, that may be exported from an exterior routing protocol to a particular instance of an interior routing protocol.

In response to receiving the prefix limit command, customer router 10A parses the command and stores the prefix limit specified in the command as prefix limit data 45 (FIG. 2) (202). The prefix limit corresponds to a maximum number of routes customer router 10A may learn from an exterior protocol, effectively limiting the number of routes that may be learned from an exterior routing protocol. Next, customer router 10A receives a route (204). Upon receiving the route, control unit 42 (FIG. 2) applies policy data 44 and performs a policy check (206) to determine whether to accept the route (208). For example, ISIS protocol 32C executing within control unit 42 may be configured to apply the following policy check upon receiving routing information from provider router 6B in FIG. 1:

from protocol bgp{
  then accept
}

In the exemplary policy check, interior ISIS protocol 32C is configured to accept all routes learned from exterior BGP protocol 32A. If the policy check reveals an invalid route, the route is rejected (209). If the policy check reveals a valid route, the route is exported from BGP protocol 32A to ISIS protocol 32C (210).

If the route was from an interior protocol (211), the control unit 42 updates routing information 36 and continues normal operation (216). If the route was from an exterior routing protocol, control unit 42 increments the respective one of prefix counters 48 (212). Control unit 42 next compares the value contained in the updated one of prefix counters 48 to the associated prefix limit specified within prefix limit data 45 (214). If the value contained in the updated one of prefix counters 48 is less than associated prefix limit, or if no limit is currently defined, the route is assumed valid, and control unit 42 updates routing information 36 and continues its normal operation (216).

However, if the value contained in the updated one of prefix counters 48 exceeds the specified prefix limit, customer router 10A transitions to an overload condition (220). In other words, exceeding a defined prefix limit causes control unit 42 to assume that a peer device, e.g., provider router 6A, is improperly communicating an excessive number of routes into customer router 10A via an external routing protocol. Control unit 42, therefore, assumes that any routes learned from an exterior protocol are invalid. Thus, control unit 42 clears, e.g., prunes, all of route data learned from any exterior routing protocols from routing information 36 (222). In addition, control unit 42 rebuilds all of the interior routes of routing information 36 and associates with each route a maximum metric, which can be viewed as the effective "distance" between customer router 10A and the other interior customer routers 10B and 10C of customer network 8A along the particular route (224). Alternatively, control unit 42 may set an overload bit within link state prefixes associated with the routes, depending upon the particular interior protocol. Control unit 42 advertises the updated routing information 36. By setting the interior routes to a maximum metric or by setting the overload bit, other internal customer routers 10B and 10C of customer network 8A will effectively avoid customer router 10A and will seek to find other routes through the network. As a result, customer router 10A is essentially removed from customer network 8A, and a potential system failure may be avoided.

Customer router 10A remains in the overload condition and waits for intervention (226). For example, customer router 10A may require input by remote client 46 to indicate that corrective action, e.g., reconfiguration of provider router 6A, has been taken and normal operation may be resumed. Router 10A may also automatically implement corrective action processes.

Figure 5:
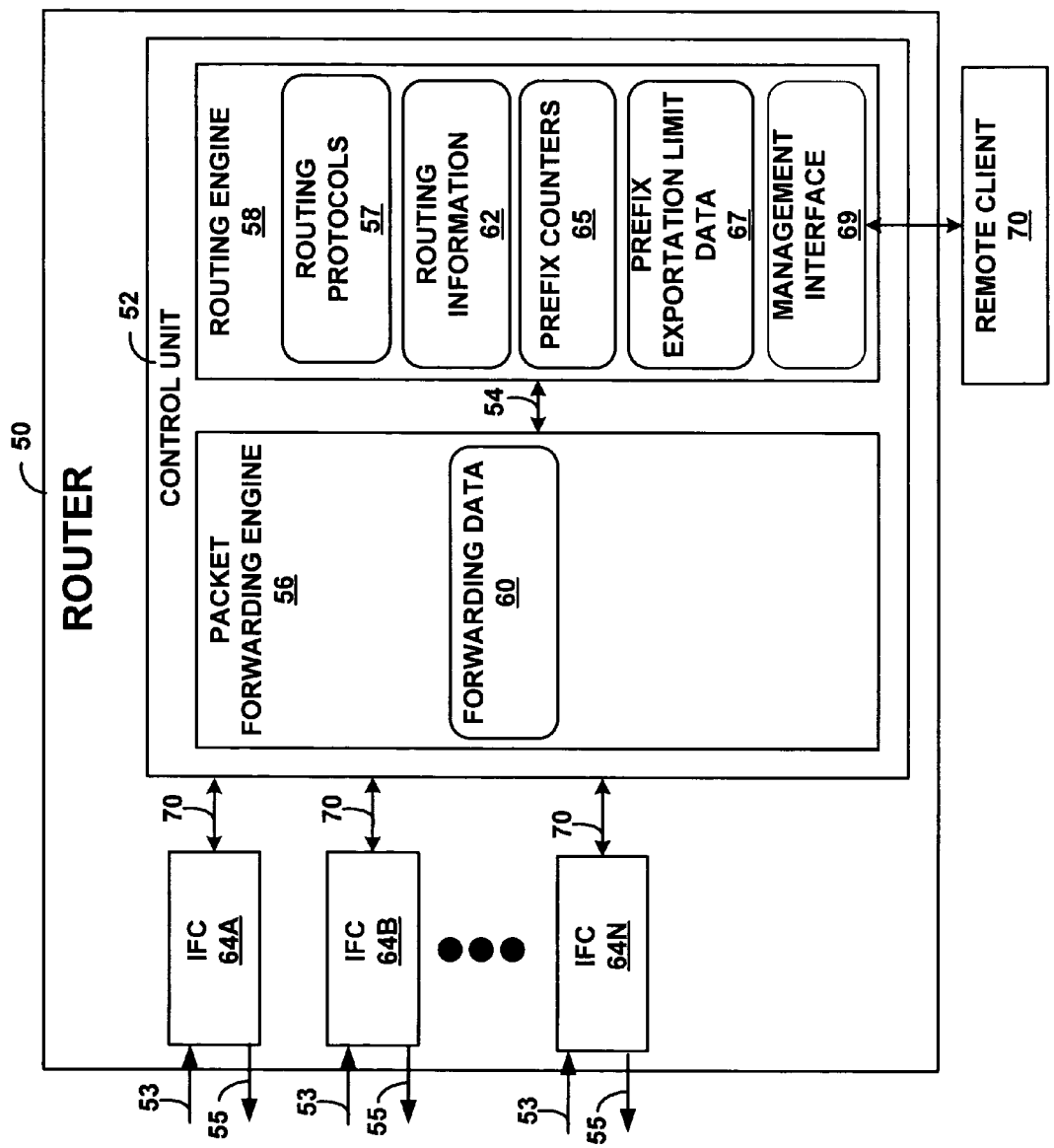
FIG. 5 is a block diagram illustrating another example embodiment of a router that be configured using the prefix limit mode described herein.

FIG. 5 is a block diagram illustrating another example embodiment of router 50 that may be configured to operate in a prefix limit mode consistent with the principles of the invention. In the illustrated embodiment, router 50 includes a control unit 52 that directs inbound packets received from inbound link 53 to the appropriate outbound link 55. In particular, the functionality of control unit 52 can be divided between a routing engine 58 and a packet-forwarding engine 56.

Routing engine 58 is primarily responsible for maintaining routing information 62 to reflect the current network topology based on routes learned from other routers, and provides an operating environment for routing protocols 57, which may include interior routing protocols and exterior routing protocols. Routing engine 58 generates forwarding data 60 in accordance with routing information 62 to associate destination information, such as IP address prefixes, with specific forwarding next hops (FNHs) and corresponding interface ports of interface cards (IFCs) 64. Forwarding data 60 may, therefore, be thought of as based on the information contained within routing information 62. In response to topology changes, routing engine 58 analyzes routing information 62, and regenerates forwarding data 60 based on the affected routes. Routing engine 58 communicates forwarding data 60 to forwarding engine 56 for use in forwarding network packets. Routing engine 58 and packet forwarding engine 56 may maintain routing information 62 and forwarding data 60 in the form of one or more tables, databases, link lists, radix trees, databases, flat files, or any other data structures.

Upon receiving an inbound packet, packet-forwarding engine 56 directs the inbound packet to an appropriate one or more of IFCs 64 for transmission based on forwarding data 60. In one embodiment, each of packet-forwarding engine 56 and routing engine 58 may comprise one or more dedicated processors, hardware, and the like, and may be communicatively coupled by data communication channel 54. Data communication channel 54 may be a high-speed network connection, bus, shared-memory or other data communication mechanism.

Remote client 70 may interact with management interface 69 to enter one or more prefix limit commands to direct router 50 to operate in prefix limit mode. For each command, remote client 70 specifies a prefix limit that defines a maximum number of routes that may be exported from an exterior routing protocol to a particular instance of interior routing protocol. Control unit 52 stores the specified prefix limits as prefix limit data 67. When operating in prefix limit mode, each time a route is exported from an exterior routing protocol to an interior routing protocol, routing engine 58 increments one of prefix counters 65 associated with that interior routing protocol. When the count contained in prefix counters 65 is at least equal to the prefix limit as designated by prefix limit data 67, the router transitions into the overload condition, as described above. The architecture of router 50 illustrated in FIG. 5 is for exemplary purposes only.

Figure 6:
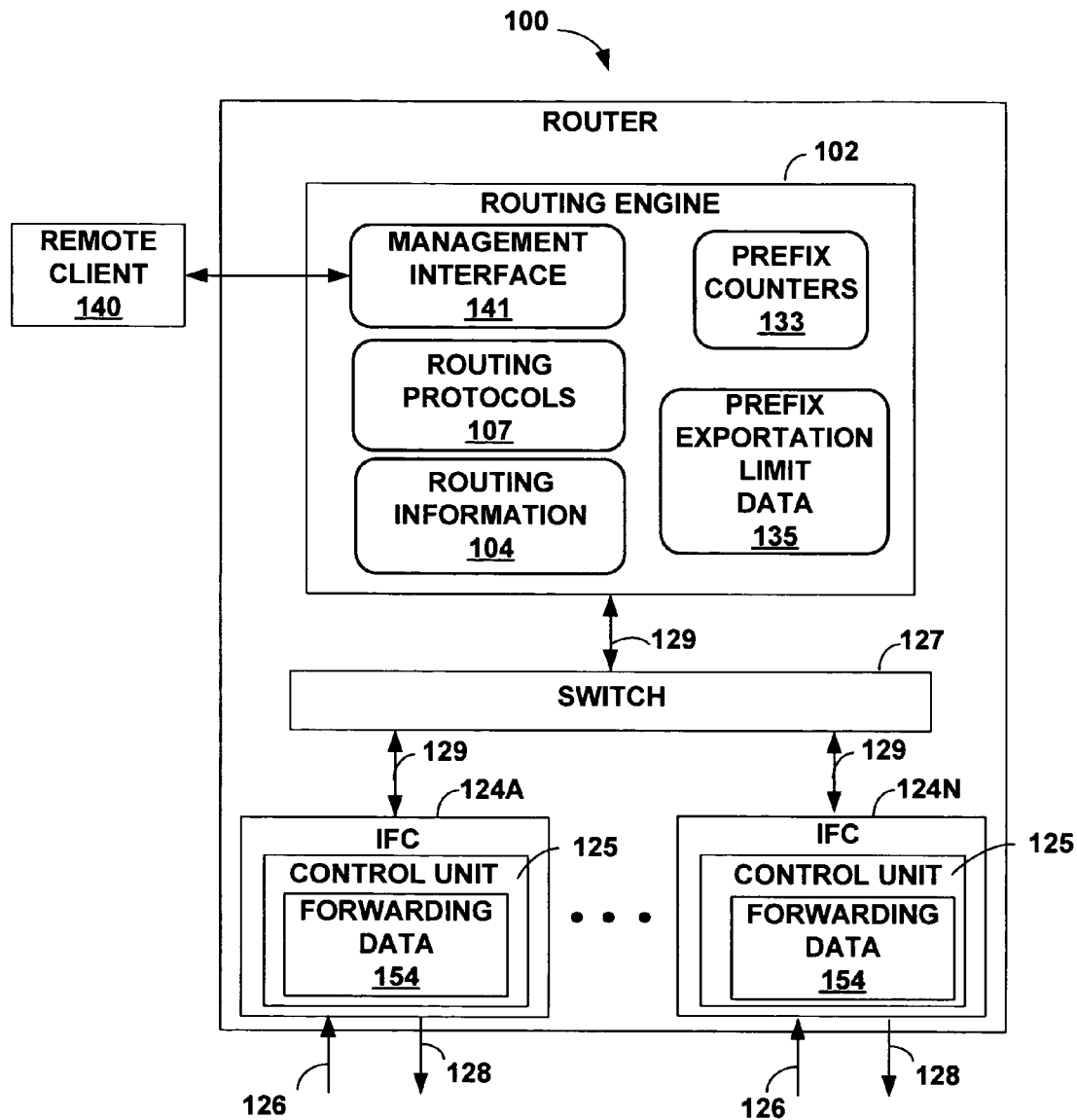
FIG. 6 is a block diagram illustrating another example embodiment of a router that may use the prefix limit mode described herein.

FIG. 6 is a block diagram illustrating another embodiment of a router 100 that may be configured to operate in the presently described prefix limit mode. In the illustrated embodiment, router 100 includes a routing engine 102 that maintains routing information 104 that describes the topology of the network to which it belongs. Routing engine 102 provides an operating environment for routing protocols 107, which may include interior routing protocols and exterior routing protocols. Routing engine 102 analyzes stored routing information 104 and generates forwarding information (not shown) for interface cards 124A-124N ("IFCs 124"). In other words, in contrast to the exemplary router 50 of FIG. 5, router 100 does not include centralized forwarding hardware. In particular, router 100 distributes the forwarding functionality to IFCs 124.

IFCs 124 receive and forward packets via network links 126 and 128, and are interconnected via a high-speed switch 127 and internal data paths 129. Switch 127 may comprise, for example, switch fabric, switchgear, a configurable network switch or hub, and the like. Data paths 129 may comprise any form of communication path, such as electrical paths within an integrated circuit, external data busses, optical links, network connections, wireless connections, and the like. IFCs 124 may be coupled to network links 126, 128 via a number of interface ports (not shown).

Each of the IFCs 124 may comprise a control unit 125 that forwards packets in accordance with forwarding data 154 generated by routing engine 102. Specifically, control unit 125 determines a next hop for each inbound packet based on the distributed forwarding information 154, identifies a corresponding IFC 124 associated with the next hop, and relays the packet to the appropriate IFC 124 via switch 127 and data paths 129.

As described above with respect to FIGS. 2 and 3, remote client 140 may enter one or more prefix limit commands to direct router 100 to operate in prefix limit mode with respect to one or more instances of an interior routing protocol. For each command, remote client 100 specifies a prefix limit that defines a maximum number of routes that may be exported from an exterior routing protocol to a particular instance of interior routing protocol. Routing engine 102 stores the specified prefix limits as prefix limit data 135. When operating in prefix limit mode, each time a route is exported from an exterior routing protocol to an interior routing protocol, routing engine 102 increments one of prefix counters 133 associated with that interior routing protocol. When the count contained in the updated one of prefix counters 133 is exceeds the respective prefix limit as designated by prefix limit data 135, router 100 transitions into an overload condition. The architecture of router 100 illustrated in FIG. 5 is for exemplary purposes only.

Various embodiments have been described. Although the techniques have been described as elements embodied within a routing device, the described elements may be distributed to multiple devices. The term "system," is used herein to generally refer to embodiments of the invention in which the described elements are embodied within a single network device or distributed to multiple network devices. These and other embodiments are within the scope of the following claims.

The invention claimed is:

1. A method comprising:
   receiving at a network device an export limit command from a client;
   counting, in response to the export limit command, a number of routes exported from an exterior routing protocol process executing on a processor of the network device to an interior routing protocol process executing on the network device; and
   when the number of routes exported from the exterior routing protocol process to the interior routing protocol process exceeds an export limit, operating the network device in an overload condition in which the processor of the network device: (i) updates routing information of the interior routing protocol to clear the routes previously exported from the exterior routing protocol, (ii) rebuilds the routing information of the interior routing protocol by updating the routing information of the interior routing protocol to set a maximum metric that defines a maximum distance for the interior routes from the network device to neighboring network devices, and (iii) advertises the updated routing information to another network device.

2. The method of claim 1, further comprising updating the routing information to set an overload bit of a link state prefix associated with the routes when the count exceeds the export limit.

3. The method of claim 1, further comprising:
   receiving from the client an export limit indicative of a maximum number of routes that can be exported from the exterior routing protocol process to the interior routing protocol process;
   comparing the counted number of routes to the export limit; and
   rejecting additional routes exported from the exterior routing protocol process to the interior routing protocol process when the counted number of routes exceeds the export limit.

4. The method of claim 3, further comprising waiting for intervention from the client before accepting the additional routes from the exterior routing protocol.

5. The method of claim 1, further comprising updating routing information of the network device when the count exceeds the export limit to clear the routes exported from the exterior routing protocol.

6. A system comprising:
   a management interface to receive a command that specifies an export limit;
   a network device comprising at least a processor and a control unit that limits a number of routes exported from an external routing protocol executing on a network device to an interior routing protocol executing on the network device in accordance with the export limit; and a plurality of instances of the interior routing protocol executing on the system, wherein the control unit separately limits the number of routes exported to each of the instances, wherein the control unit includes a plurality of prefix counters to maintain respective counts for the number of routes exported to each of the instances, and wherein the control unit identifies an instance of the interior routing protocol to which routes were exported, accesses the respective prefix counter to compare the stored count with an associated prefix limit, and when the stored count exceeds the associated prefix limit, operates the network device in an overload condition in which the control unit of the network device: (i) updates routing information of the identified instance of the interior routing protocol to clear the routes previously exported from the exterior routing protocol, (ii) rebuilds the routing information of the identified instance of the interior routing protocol by updating the routing information of the identified instance of the interior routing protocol to set a maximum metric that defines a maximum distance for the interior routes of the identified instance of the interior routing protocol from the network device to neighboring network devices, and (iii) advertises the updated routing information to another network device.

7. The system of claim 6, wherein the exterior routing protocol supports a larger number of routes than the interior routing protocol.

8. The system of claim 7, wherein the control unit communicates with an internet service provider via the exterior routing protocol.

9. The system of claim 6, wherein the system comprises a router, and wherein the router includes the management interface and the control unit.

10. A non-transitory computer-readable medium comprising instructions to cause a processor to:

receiving at a network device an export limit command from a client;

counting, in response to the export limit command, a number of routes exported from an exterior routing protocol process executing on a processor of the network device to an interior routing protocol process executing on the network device; and when the number of routes exported from the exterior routing protocol process to the interior routing protocol process exceeds an export limit, operating the network device in an overload condition in which the processor of the network device: (i) updates routing information of the interior routing protocol to clear the routes previously exported from the exterior routing protocol, (ii) rebuilds the routing information of the interior routing protocol by updating the routing information of the interior routing protocol to set a maximum metric that defines a maximum distance for the interior routes from the network device to neighboring network devices, and (iii) advertises the updated routing information to another network device.

11. The system of claim 9, wherein the management interface receives the command from a remote client.

12. The system of claim 11, wherein the remote client comprises one of a human user and an automated script.

\* \* \* \* \*